United States Patent
Kimura (10) Patent No.: US 11,720,308 B2
(45) Date of Patent: Aug. 8, 2023

(54) IMAGE FORMING SYSTEM WITH IMPROVED MANAGEMENT OF PRINTING RESOURCES

(71) Applicant: KYOCERA Document Solutions Inc., Osaka (JP)

(72) Inventor: Atsushi Kimura, Osaka (JP)

(73) Assignee: Kyocera Document Solutions, Inc.

(*) Notice: Subject to any disclaimer, the term of this patent is extended or adjusted under 35 U.S.C. 154(b) by 0 days.

(21) Appl. No.: 17/727,321

(22) Filed: Apr. 22, 2022

(65) Prior Publication Data

US 2022/0357906 A1     Nov. 10, 2022

(30) Foreign Application Priority Data

May 10, 2021   (JP) .............................. 2021-079473

(51) Int. Cl.
    *G06F 3/12*          (2006.01)
    *G06K 15/02*       (2006.01)

(52) U.S. Cl.
    CPC .......... *G06F 3/1275* (2013.01); *G06F 3/1203* (2013.01); *G06F 3/1229* (2013.01); *G06K 15/1823* (2013.01)

(58) Field of Classification Search
None
See application file for complete search history.

(56) References Cited

U.S. PATENT DOCUMENTS

| | | | | |
|---|---|---|---|---|
| 7,239,408 B1* | 7/2007 | Whitmarsh | ........... | G06F 3/1253 358/1.9 |
| 8,310,700 B2* | 11/2012 | Rai | ....................... | G06F 3/1288 358/1.14 |
| 9,774,750 B1* | 9/2017 | Zehler | ................... | G06F 3/1291 |
| 2012/0218593 A1* | 8/2012 | Dumitrescu | .......... | G06F 3/1205 358/1.15 |
| 2017/0262867 A1* | 9/2017 | Hagiwara | ............. | G06F 3/0482 |
| 2019/0286400 A1* | 9/2019 | Okanishi | ............... | G06F 3/1273 |
| 2020/0050412 A1* | 2/2020 | Ohhashi | ................ | G06F 3/1258 |
| 2022/0229619 A1* | 7/2022 | Lao | ........................ | G06F 3/1296 |

FOREIGN PATENT DOCUMENTS

| | | |
|---|---|---|
| JP | 2005-254677 | 9/2005 |
| JP | 2006-209408 | 8/2006 |

* cited by examiner

*Primary Examiner* — Henok Shiferaw (57) ABSTRACT

An image forming system includes a print system and a management server. The print system includes one or plural image forming apparatuses. The management server receives a print order from a user, and upon receiving the print order, performs a print job using the print system under a print condition specified by the print order. Further, the management server generates a suggestion of a print condition in consideration of operation status of the print system and an amount of a consumable good required for the print job, differently from the print condition specified by the print order, and notifies the user of the suggestion.

6 Claims, 9 Drawing Sheets

IMAGE FORMING SYSTEM WITH IMPROVED MANAGEMENT OF PRINTING RESOURCES

CROSS-REFERENCE TO RELATED APPLICATIONS

This application relates to and claims priority rights from Japanese Patent Application No. 2021-079473, filed on May 10, 2021, the entire disclosures of which are hereby incorporated by reference herein.

BACKGROUND

1. Field of the Present Disclosure

The present disclosure relates to an image forming system.

2. Description of the Related Art

A printer control device receives a print order, and upon receiving the print order, efficiently performs a print job of the print order using plural printers.

A printing system makes a schedule of plural print jobs of plural print orders so as to continuously arrange print jobs having the same settings among the plural print jobs in consideration of settings (number of pages, paper sheet size, color/monochrome setting, quality level, delivery date and/or the like) of the print orders, and thereby efficiently performs the print jobs.

Although the aforementioned printing system efficiently performs the print jobs in consideration of "quality" and "delivery date", the aforementioned printing system may not process the print orders under an efficient condition for both of an orderer side and an order recipient side because priority of each item such as quality level or delivery date in the orderer side is not considered and a situation (busyness degree, stock status of consumable goods and/or the like) in the order recipient side is not considered.

For example, regarding "delivery date", an earliest delivery date may not be the best for the both sides. If the delivery date is earlier than a scheduled date on which the orderer side uses a printed matter of the print order, then it takes some costs for the orderer side to maintain the printed matter in a warehouse or the like; and if a finished date on the order recipient side is earlier than an actual delivery date (e.g. the day before the scheduled date on the orderer side), then it takes some costs for the order recipient side to maintain the finished printed matter. Further, the finished date in the order recipient side changes due to busyness degree of received orders, stock status of consumable goods and/or the like. Therefore, "quality", "cost", "delivery date" and/or the like may not be set as the best for the both sides.

SUMMARY

An image forming system according to an aspect of the present disclosure includes a print system and a management server. The print system includes one or plural image forming apparatuses. The management server is configured to receive a print order from a user, and upon receiving the print order, perform a print job using the print system under a print condition specified by the print order. Further, the management server generates a suggestion of a print condition in consideration of operation status of the print system and an amount of a consumable good required for the print job, differently from the print condition specified by the print order; and notifies the user of the suggestion.

An image forming system according to an aspect of the present disclosure includes a print system and a management server. The print system includes one or plural image forming apparatuses. The management server is configured to receive a print order from a user, and upon receiving the print order, perform a print job using the print system under a print condition specified by the print order. Further, the management server (a) receives from a user a resource reservation order to reserve a usage amount of the consumable good, (b) performs the print job using the reserved usage amount of the consumable good, and (c) in accordance with a request from the user, transfers or sells the reserved usage amount of the consumable good to another user.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
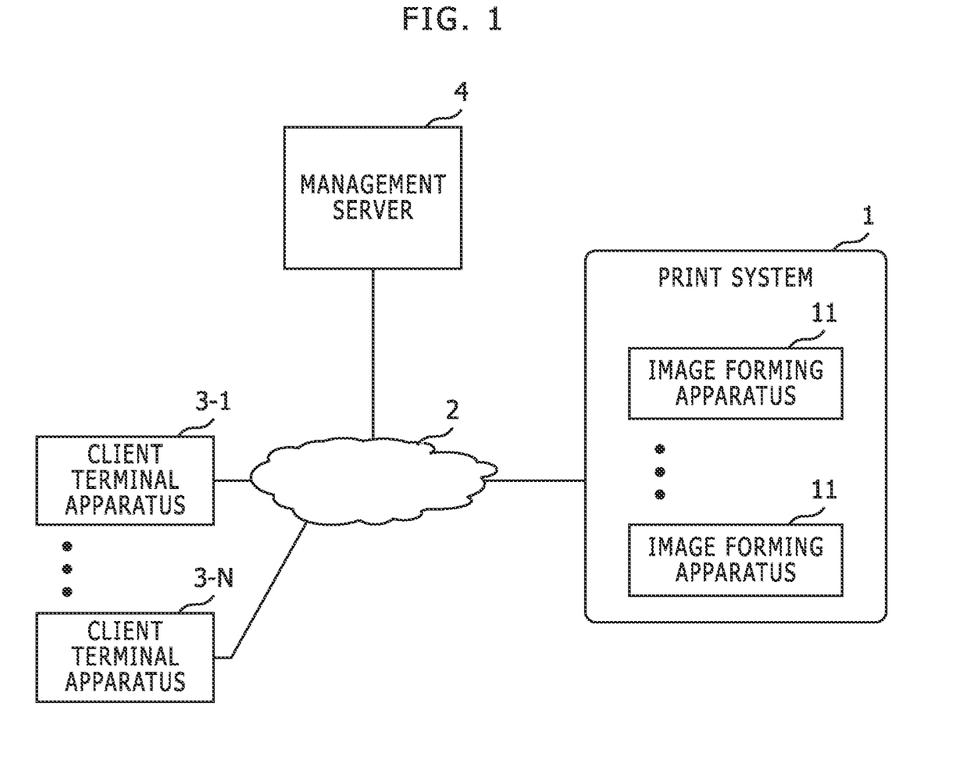
FIG. 1 shows a block diagram that indicates a configuration of an image forming system in an embodiment of the present disclosure.

FIG. 1 shows a block diagram that indicates a configuration of an image forming system in an embodiment of the present disclosure. The system shown in FIG. 1 includes a print system 1, one or plural client terminal apparatuses 3 connected to a network 2, and a management server 4 connected to the network 2.

The print system 1 includes one or plural image forming apparatuses 11 capable of data communication with the management server 4. Each of the image forming apparatus(es) 11 is an apparatus such as printer that receives a print job request and prints an image specified by the print job request; and the management server 4 receives a print order, and upon receiving the print order, transmits to the aforementioned one or plural image forming apparatuses 11 one or plural print job requests corresponding to the print order. The image forming apparatuses 11 may be the same apparatuses as each other or may be the different apparatuses from each other.

Here, the network 2 is a wide area network such as Internet, and the print system 1 performs data communication with the management server 4 through the network 2. Alternatively, the print system 1 may perform the data communication through another network than the network 2.

Each client terminal apparatus 3-$i$ ($i$=1, . . . , N) is a terminal apparatus such as personal computer operated by an orderer of the print order, and for example, accesses the management server 4 using a web browser or the like, generates a print order with a condition specified by the orderer, and transmits the print order to the management server 4; and generates sorts of orders regarding a resource reservation as mentioned below and transmits the orders to the management server 4. For example, the aforementioned orders include a user ID of a user who operates this client terminal apparatus 3-$i$, and the management server 4 determines a sender of the order on the basis of the user ID.

Figure 2:
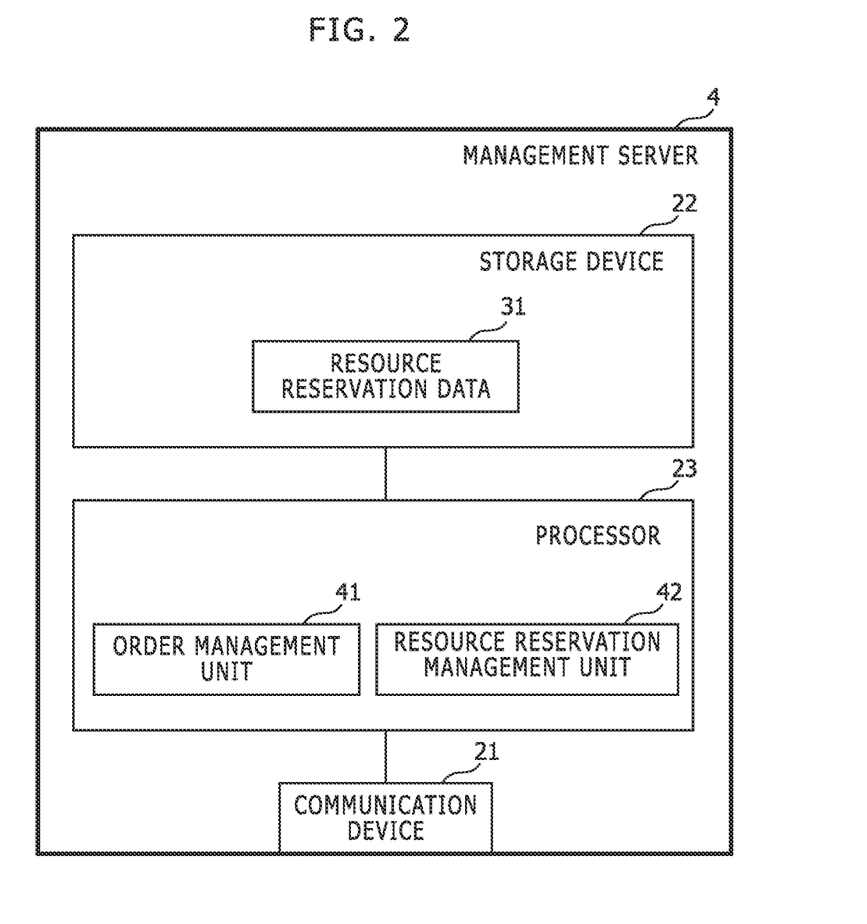
FIG. 2 shows a block diagram that indicates a configuration of a management server shown in FIG. 1.

FIG. 2 shows a block diagram that indicates a configuration of a management server shown in FIG. 1. The management server 4 includes a communication device 21 such as network interface, a storage device 22, and a processor 23.

The communication device 21 is connected to the network 2, and performs data communication with another device (the client terminal apparatus 3-$i$ or the like) connected to the network 2 in accordance with a predetermined communication protocol.

The storage device 22 is a non volatile storage device that stores sorts of programs and data, and here stores resource reservation data 31 mentioned below.

The processor 23 is a computer that includes a CPU (Central Processing Unit), a ROM (Read Only Memory), a RAM (Random Access Memory) and the like, loads a program from the ROM, the storage device 22 or the like to the RAM, and executes the program with the CPU and thereby acts as various processing units.

Here, the processor 23 acts as an order management unit 41 and a resource reservation management unit 42.

The order management unit 41 receives a print order from a user (specifically, from the client terminal apparatus 3-$i$ of the user), and upon receiving the print order, performs a print job using the print system 1 under a print condition specified by the print order.

The print order specifies a paper sheet (size and type), a print resolution, and a color type (color or monochrome) as print setting on quality, and also specifies a desired delivery date. On the basis of the print setting and the delivery date, a cost for the print order is derived. It should be noted that the print order does not specify any image forming apparatuses 11 to be used for the print job, and the order management unit 41 selects the image forming apparatus(es) 11 to be used for the print job.

The order management unit 41 watches a status (an operation status, a residual amount of a consumable good and/or the like) of each of the image forming apparatuses 11 in the print system 1, selects one or plural image forming apparatuses 11 to be caused to perform the print job of the print order on the basis of the status, generates one or plural print job requests, and transmits the generated print job request(s) to the selected image forming apparatus(es) 11.

Further, the order management unit 41 generates a suggestion (hereinafter, called "order suggestion") of a print condition in consideration of operation status of the print system 1 and an amount of a consumable good (such as toner and/or paper sheet) required for the print job, differently from the print condition specified by the print order; and notifies the user of the order suggestion.

In this process, the order management unit 41 receives priority information from the user and the priority information indicates a priority level of each of one or plural specific items (here, quality, cost, and delivery date) in the print condition; and the order management unit 41 generates the suggestion in consideration of the priority information together with the operation status of the print system 1 and the amount of the consumable good.

Figure 3:
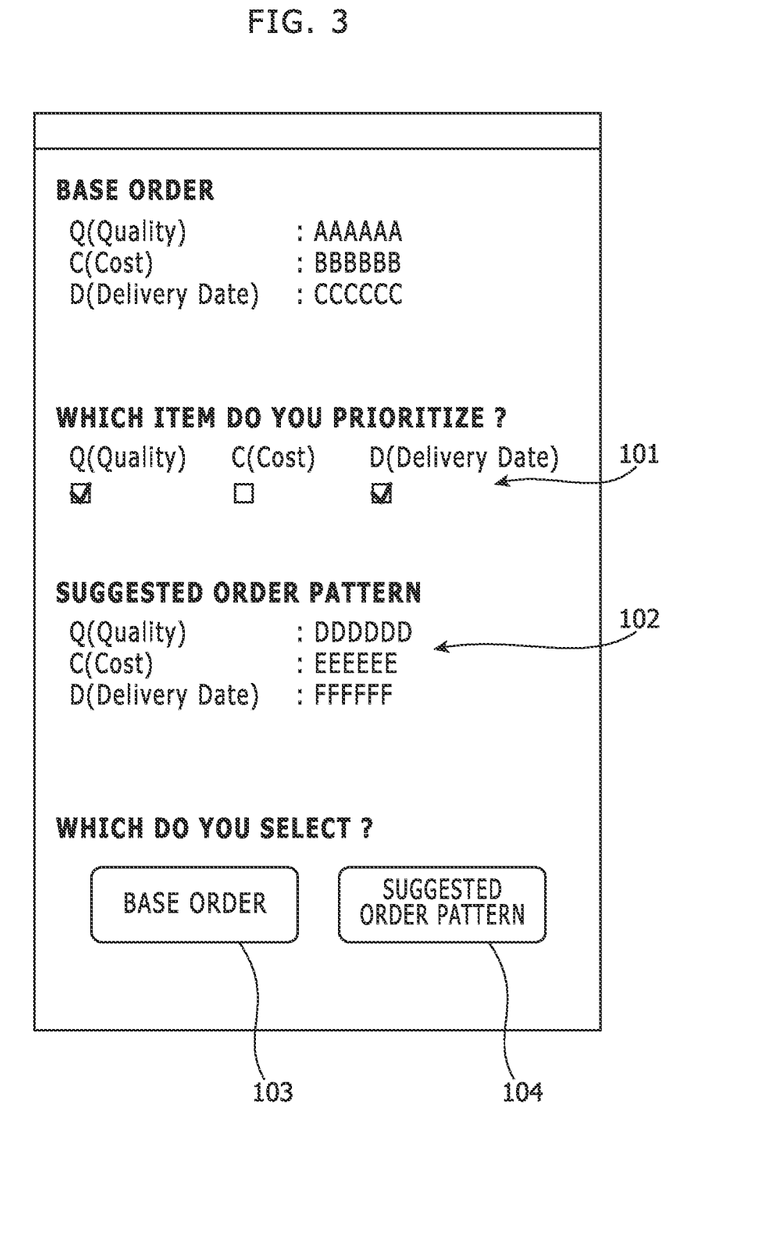
FIG. 3 shows a diagram that indicates an example of an order suggestion screen.

FIG. 3 shows a diagram that indicates an example of an order suggestion screen.

In this embodiment, upon receiving the print order, the order management unit 41 causes the client terminal apparatus 3-$i$ of the orderer user to display an order suggestion screen to receive the aforementioned priority information, for example, as shown in FIG. 3. The order suggestion screen includes an operation part 101 (here, check box) for the user to select one or plural items that the user considers as high priority item(s), and the order management unit 41 determines that an item that the user selected among "quality" (image quality and finishing quality of a paper sheet), "cost", and "delivery date" is an item having higher priority than the other items.

For example, if the priority of "delivery date" is high, then an order suggestion is generated in which at least one of image quality and finishing quality of a paper sheet is lowered; if the priority of the image quality is high, then an order suggestion is generated in which image quality is raised by changing a finishing quality of a paper sheet; and if the priority of the finishing quality of a paper sheet is high, then an order suggestion is generated in which image quality is lowered to restrain paper sheet curl. Subsequently, the order management unit 41 displays an order suggestion 102 generated as mentioned, in the order suggestion screen as shown in FIG. 3, for example.

For example, as shown in FIG. 3, the order suggestion screen further includes soft keys 103 and 104 for the user to select a desired order pattern among a base order (i.e. the original order) and the suggested order pattern, and the order management unit 41 determines which one of the soft keys 103 and 104 was pushed down by the user, and fixes an order pattern of the user's print order as the order pattern corresponding to the determined soft key 103 or 104.

The resource reservation management unit 42 receives a resource reservation order to reserve a usage amount of a consumable good, and manages a resource reservation of each user. Here, the resource reservation management unit 42 performs registration, renewal, transfer, sale, and auction and the like of the resource reservation of each user.

The resource reservation order specifies a type, a usage amount, and a reservation period of a consumable good to be reserved. Here, this consumable good is a print sheet and/or a colorant (toner or ink), and as the usage amounts of the print sheet, the number of the print sheets to be used is specified and/or as the usage amounts of the colorant, a colorant usage amount to be used is specified. The resource reservation management unit 42 ensures the resource-reserved consumable good (i.e. the specified usage amount of the consumable good of the specified type) in a residual amount of the consumable good in the print system 1 such that the resource-reserved consumable good is not used in a print job of another user. Therefore, as a residual amount of the consumable good considered when generating the order suggestion, the order management unit 41 uses an amount obtained by subtracting the resource-reserved consumable good usage amount from an actual residual amount of the consumable good (i.e. a residual amount of the consumable good acquired in the print system 1).

The reserved usage amount may be ensured in a current residual amount of the consumable good in a single image forming apparatus 11, and alternatively, may be ensured in current residual amounts of the consumable goods in plural image forming apparatuses 11. Further, if the reserved usage amount can not ensure in a total of current residual amounts of the consumable good in all of the image forming apparatuses 11 in the print system 1, then an administrator of this system may be notified of a warning to replenish the insufficient consumable good (by the management server 4, for example).

The actual delivery date may be determined under a condition that the resource-reserved consumable good is primarily used in a print job of the aforementioned print order. Further, a reservation ID may be issued when the resource reservation is performed, and when the reservation ID is specified in the aforementioned print order, a print job of the print order may use the consumable good ensured in the resource reservation corresponding to the specified reservation ID. As mentioned, performing the resource reservation in advance restrains consumable-good shortage when the print order is received, and consequently, delivery delay tends not to occur.

The resource reservation management unit 42 manages a resource reservation of each user using the resource reservation data 31 stored in the storage device 22, and upon receiving a resource reservation order from a user (specifically, the client terminal apparatus 3-*i* of the user), renews a resource reservation that this user holds among resource reservations in the resource reservation data 31 on the basis of the resource reservation order (specifically, increases a reserved usage amount of the specified consumable good). Further, when a print job of a print order from a user is received by the order management unit 41 and an order pattern for the print order is fixed, with regard to a consumable good to be used in the print job, the resource reservation management unit 42 reduces a reserved usage amount of the consumable good in the resource reservation data 31 of this user by an amount of the consumable good used in the print job.

When generating the order suggestion as mentioned, the order management unit 41 generates the order suggestion in further consideration of the reserved usage amount of the consumable good reserved by the resource reservation order.

Further, in accordance with a request from a user, the resource reservation management unit 42 transfers or sells the reserved usage amount of the consumable good to another user. The resource reservation management unit 42 is configured to be capable of selling the reserved usage amount of the consumable good to another user in an auction manner, in accordance with a request from the user. In the auction manner, for example, the resource reservation management unit 42 determines a purchaser of a resource-reserved usage amount and sells it to the determined purchaser, as well as in an existent auction system.

Figure 4:
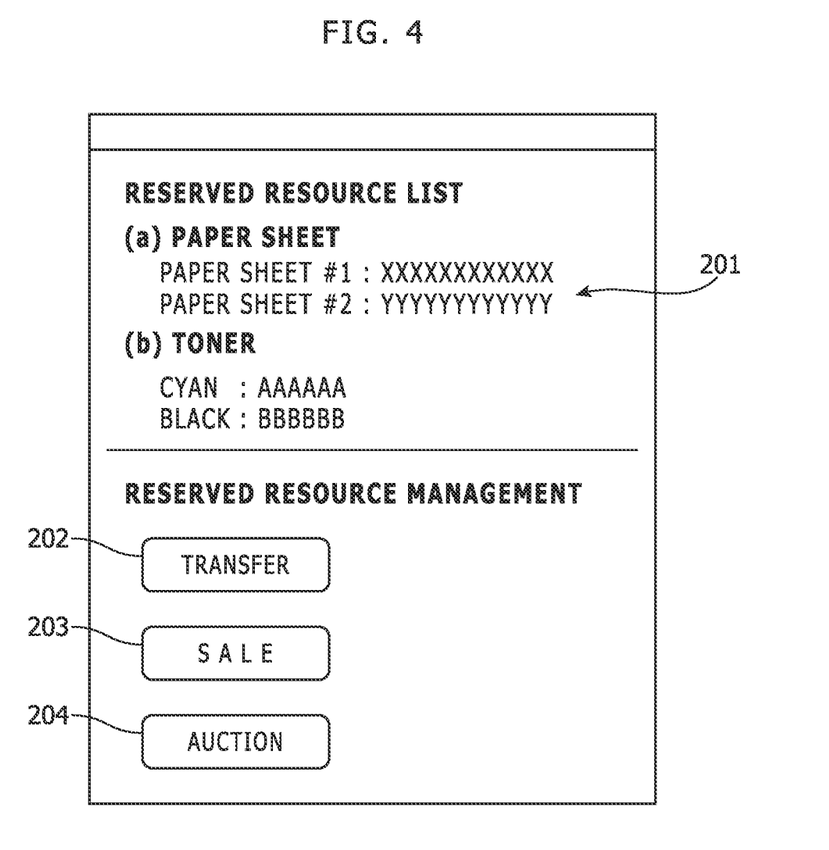
FIG. 4 shows a diagram that indicates an example of a reserved-resource screen.

FIG. 4 shows a diagram that indicates an example of a reserved-resource screen.

In accordance with a request of a user from the client terminal apparatus 3-*i* of the user, the resource reservation management unit 42 causes the client terminal apparatus 3-*i* to display a reserved-resource screen that indicates a resource reservation (a reserved usage amount of each consumable-good type) that the user currently holds, for example, as shown in FIG. 4.

The reserved-resource screen includes a list 201 of resource reservations that this user currently holds, a soft key 202 to perform a transfer order of a resource reservation, a soft key 203 to perform a sale order of a resource reservation, and a soft key 204 to perform an auction order of a resource reservation.

Upon detecting pushing down the soft key 202, the resource reservation management unit 42 causes the client terminal apparatus 3-*i* to display a setting screen for the transfer order, and receives as the transfer order a setting (a type and an amount of a consumable good to be transferred, a recipient user who receives the resource reservation to be transferred, and the like) inputted to the setting screen.

Upon detecting pushing down the soft key 203, the resource reservation management unit 42 causes the client terminal apparatus 3-*i* to display a setting screen for the sale order, and receives as the sale order a setting (a type and an amount of a consumable good to be sold, a price, a sale period, and the like) inputted to the setting screen.

Upon detecting pushing down the soft key 204, the resource reservation management unit 42 causes the client terminal apparatus 3-*i* to display a setting screen for the auction order, and receives as the auction order a setting (a type and an amount of a consumable good to be sold in an auction manner, a lower limit bidding price, an auction period, and the like) inputted to the setting screen.

The following part explains a behavior of the aforementioned image forming system.

(a) Print Order Process

Figure 5:
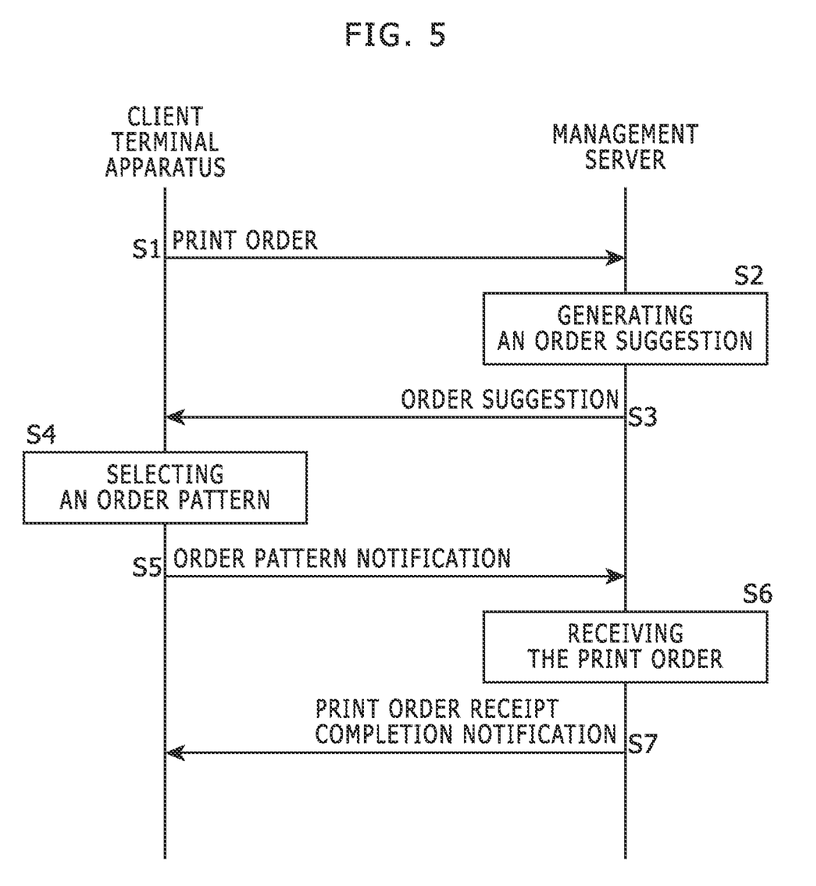
FIG. 5 shows a sequence diagram that explains a process for a print order in the image forming system shown in FIG. 1.

FIG. 5 shows a sequence diagram that explains a process for a print order in the image forming system shown in FIG. 1.

An orderer user operates his/her client terminal apparatus 3-*i* and thereby sets a print condition (a condition on quality and delivery date as mentioned) and causes the client terminal apparatus 3-*i* to transmit a print order based on the print condition. The client terminal apparatus 3-*i* transmits the print order to the management server 4 (in Step S1).

In the management server 4, the order management unit 41 receives the print order using the communication device 21; and upon receiving the print order, causes the client terminal apparatus 3-*i* to display the order suggestion screen as mentioned, receives priority information of the user, generates an order suggestion in consideration of the aforementioned resource reservation, operation status of the print system 1, an amount of the consumable good required to a print job and the like (in Step S2), and causes the client terminal apparatus 3-*i* to display the order suggestion in the order suggestion screen, for example, as shown in FIG. 3 (in Step S3).

The user performs to the client terminal apparatus 3-*i* an operation to select any one of the base order and the order pattern of the order suggestion. The client terminal apparatus 3-*i* determines the order pattern specified by this operation, and notifies the management server 4 of the determined order pattern.

In the management server 4, the order management unit 41 receives the notification (the determined order pattern); and upon receiving the notification, receives a print order with the determined order pattern (in Step S6), and transmits a print order receipt completion notification to the client terminal apparatus 3-*i* using the communication device 21 (in Step S7).

Subsequently, the order management unit 41 makes a schedule of the print order and generates one or plural print jobs corresponding to the print order, and causes the print system 1 to perform the generated print job(s).

(b) Registration of a Resource Reservation

Figure 6:
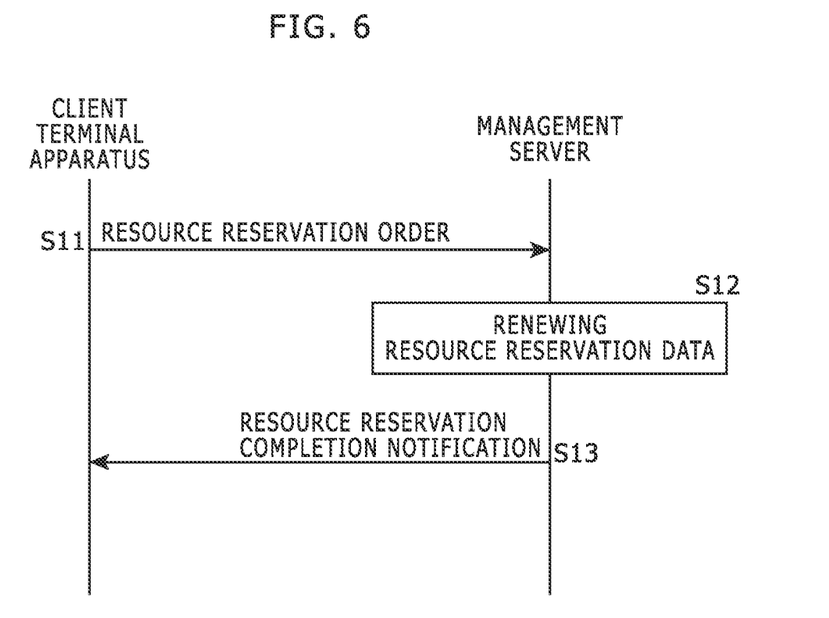
FIG. 6 shows a sequence diagram that explains a registration process for a resource reservation in the image forming system shown in FIG. 1.

FIG. 6 shows a sequence diagram that explains a registration process for a resource reservation in the image forming system shown in FIG. 1.

A user operates his/her client terminal apparatus 3-*i* and thereby sets a type and an amount of a consumable good that the user wants to reserve and causes the client terminal apparatus 3-*i* to transmit a resource reservation order based on the type and the amount of the consumable good. The client terminal apparatus 3-*i* transmits the resource reservation order to the management server 4 (in Step S11).

In the management server 4, the resource reservation management unit 42 receives the resource reservation order using the communication device 21; and upon receiving the resource reservation order, determines the user who transmitted the resource reservation order, and renews the resource reservation data 31 of the determined user (in Step S12).

Specifically, the consumable good type and the reserved usage amount specified in the resource reservation order are determined, and the reserved usage amount of the specified consumable good type in the resource reservation data 31 of the determined user is increased by the specified reserved usage amount.

Upon the renewal of the resource reservation data 31, the resource reservation management unit 42 transmits a resource reservation completion notification to the client terminal apparatus 3-*i* using the communication device 21 (in Step S13).

At this time, the resource reservation management unit 42 performs a charging process to this user for this resource reservation. In this charging process, a charged amount may be set in accordance with a reservation period.

(c) Transfer Process of a Resource Reservation

Figure 7:
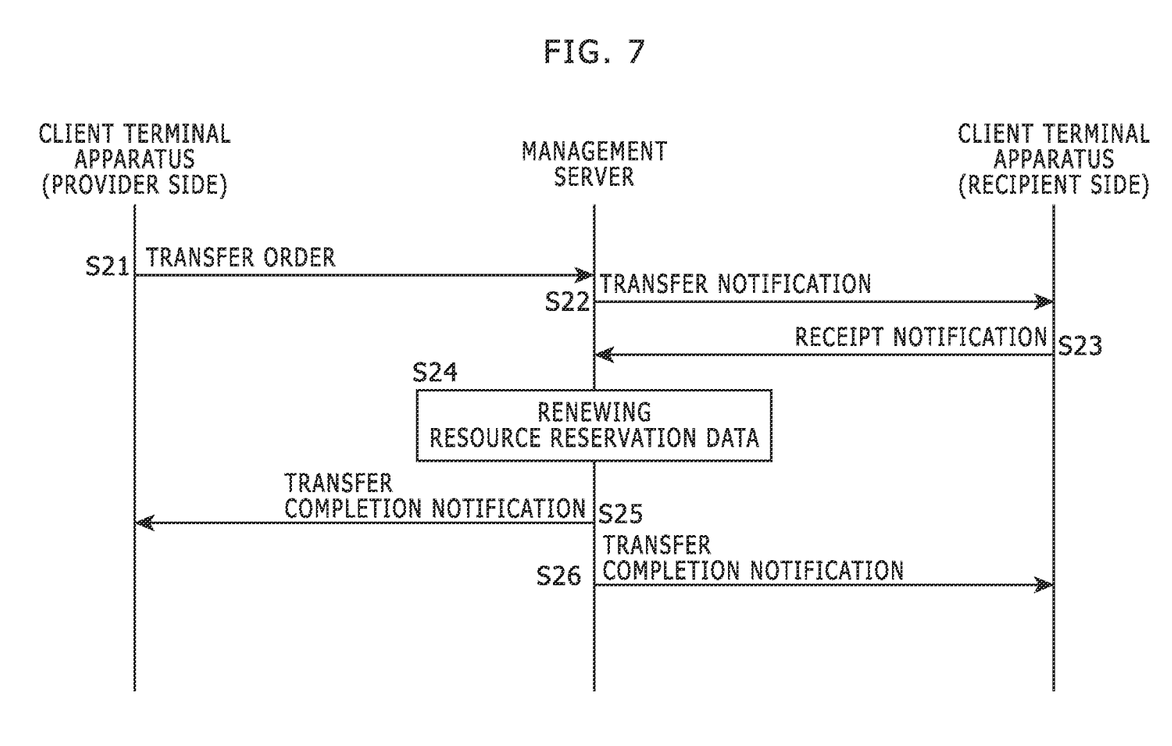
FIG. 7 shows a sequence diagram that explains a transfer process for a resource reservation in the image forming system shown in FIG. 1.

FIG. 7 shows a sequence diagram that explains a transfer process for a resource reservation in the image forming system shown in FIG. 1.

A user operates his/her client terminal apparatus 3-*i* and thereby sets a type and an amount of a consumable good that the user wants to transfer, and a recipient user (his/her user ID) who receives the resource reservation of this consumable good, and causes the client terminal apparatus 3-*i* i to transmit a transfer order based on the type and the amount of the consumable good and the recipient user. The client terminal apparatus 3-*i* transmits the transfer order to the management server 4 (in Step S21).

In the management server 4, the resource reservation management unit 42 receives the transfer order using the communication device 21; and upon receiving the transfer order, determines the provider user who transmitted the transfer order and the recipient user, and transmits a transfer notification to the client terminal apparatus 3-*j* of the recipient user (in Step S22).

Upon receiving the transfer notification, the client terminal apparatus 3-*j* of the recipient side displays the transfer notification (the provider user, the type and the reserved amount of the consumable good transferred) to the recipient user, and transmits to the management server 4 a receipt notification that indicates acceptance of the transfer (in Step S23).

In the management server 4, the resource reservation management unit 42 receives the receipt notification using the communication device 21; and upon receiving the receipt notification, renews the resource reservation data 31 of the provider user and the recipient user (in Step S24).

Specifically, in the resource reservation data 31, the reserved usage amount of the specified consumable good type specified by the transfer order in regard to the provider user is decreased by the reserved usage amount specified by the transfer order, and the reserved usage amount of the specified consumable good type specified by the transfer order in regard to the recipient user is increased by the reserved usage amount specified by the transfer order.

Upon the renewal of the resource reservation data 31, the resource reservation management unit 42 transmits a transfer completion notification to the client terminal apparatuses 3-*i* and 3-*j* using the communication device 21 (in Steps S25 and S26).

(d) Sale Process of a Resource Reservation (General Sale)

Figure 8:
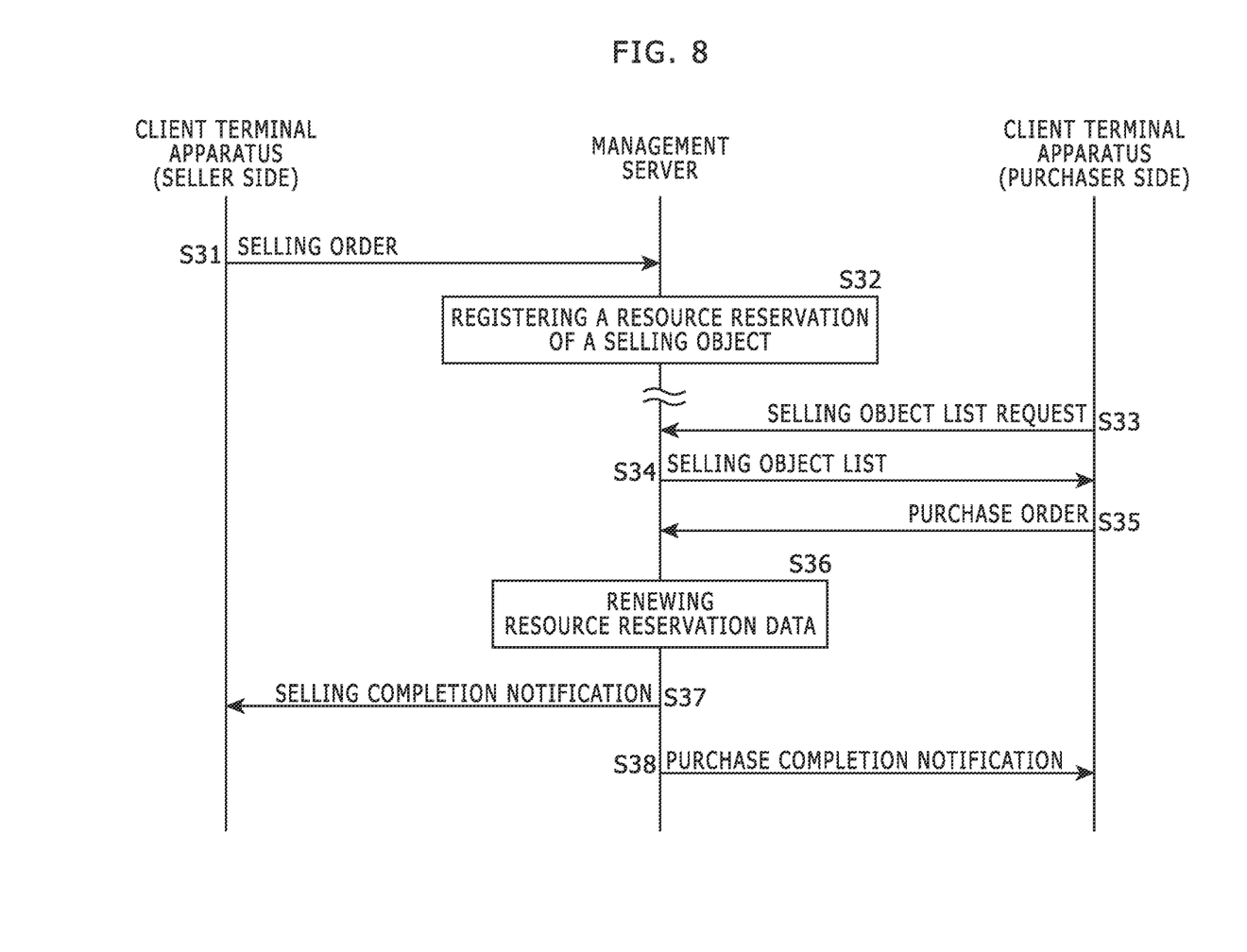
FIG. 8 shows a sequence diagram that explains a sale process for a resource reservation in the image forming system shown in FIG. 1.

FIG. 8 shows a sequence diagram that explains a sale process for a resource reservation in the image forming system shown in FIG. 1.

A user operates his/her client terminal apparatus 3-*i* and thereby sets a type and a reserved usage amount of a consumable good that the user wants to sell, and causes the client terminal apparatus 3-*i* to transmit a sale order based on the type and the reserved usage amount of the consumable good. The client terminal apparatus 3-*i* transmits the sale order to the management server 4 (in Step S31).

In the management server 4, the resource reservation management unit 42 receives the sale order using the communication device 21; and upon receiving the sale order, determines the seller user who transmitted the sale order, and registers in a selling object list a selling object (the consumable good type and the reserved usage amount) and a selling price specified by the sale order so as to associate the specified selling object and the specified selling price with the determined seller user (in Step S32). The selling object list is stored in the storage device 22.

On the other hand, if another user wants to purchase a resource reservation, this user operates his/her client terminal apparatus 3-*j*, and thereby causes the client terminal apparatus 3-*j* to transmit a selling object list request. The client terminal apparatus 3-*j* transmits the selling object list request to the management server 4 (in Step S33). The resource reservation management unit 42 in the management server 4 receives the selling object list request using the communication device 21, and upon receiving the selling object list request, transmits the selling object list to the client terminal apparatus 3-*j* (in Step S34).

Upon receiving the selling object list, the client terminal apparatus 3-*j* displays the selling object list to the purchaser user. The purchaser user performs to the client terminal apparatus 3-*j* an operation to specify a selling object that the purchaser user wants to purchase in the selling object list. Upon receiving this operation, the client terminal apparatus 3-*j* transmits to the management server 4 a purchase order to purchase the specified selling object (in Step S35).

In the management server 4, the resource reservation management unit 42 receives the purchase order using the communication device 21; and upon receiving the purchase order, (a) performs a charging process for charging from the seller user to the purchaser user, (b) renews the resource reservation data 31 of the seller user and the purchaser user, and (c) deletes the selling object specified by the purchase order in the selling object list (in Step S36).

Specifically, in the resource reservation data 31, the reserved usage amount of the specified consumable good type specified by the sale order in regard to the seller user is decreased by the reserved usage amount specified by the sale order, and the reserved usage amount of the specified consumable good type specified by the sale order in regard to the purchaser user is increased by the reserved usage amount specified by the sale order.

Upon the renewal of the resource reservation data 31, the resource reservation management unit 42 transmits a selling completion notification to the client terminal apparatus 3-*i* and transmits a purchase completion notification to the client terminal apparatus 3-*j*, using the communication device 21 (in Steps S37 and S38).

(e) Auction Process of a Resource Reservation

Figure 9:
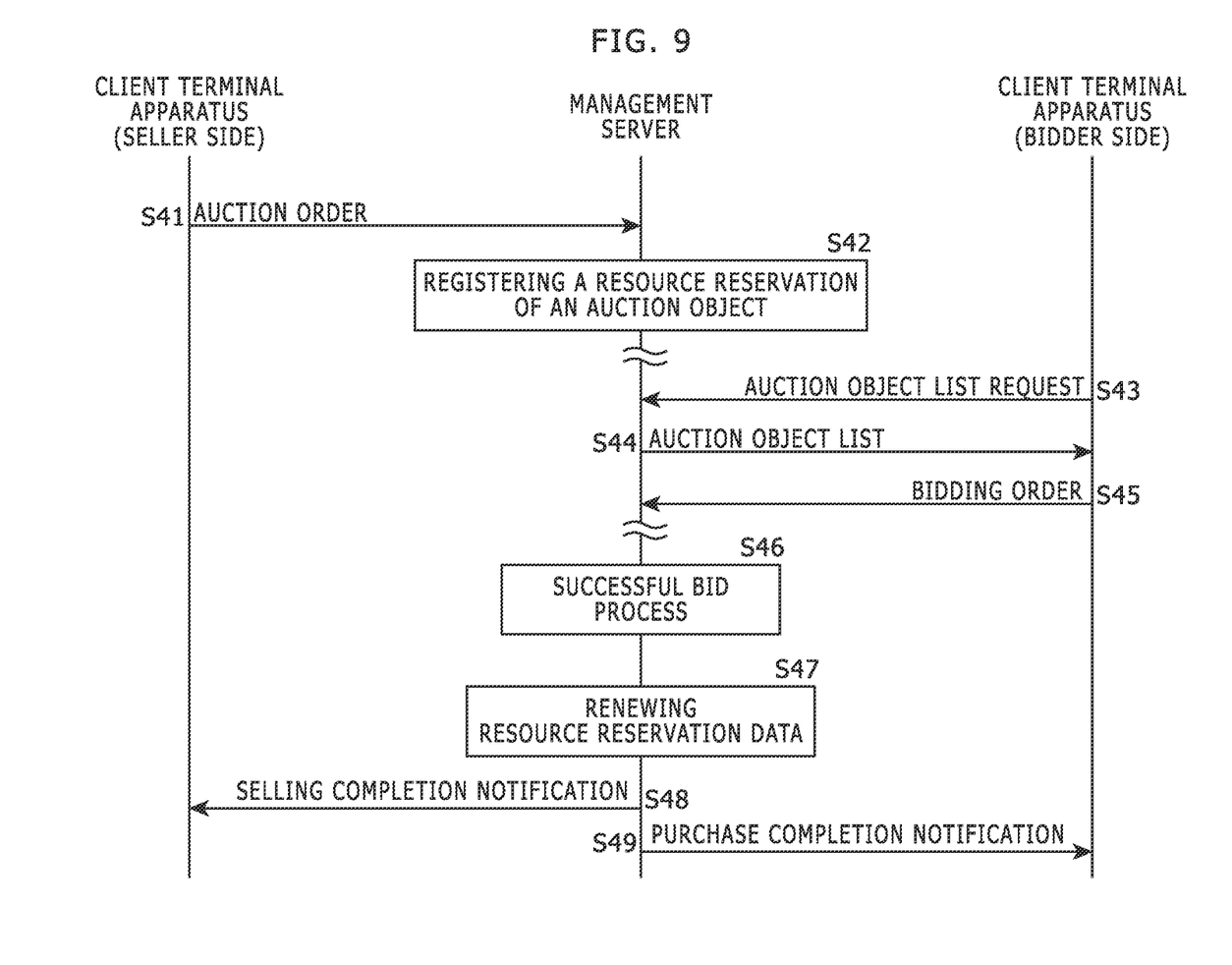
FIG. 9 shows a sequence diagram that explains an auction process for a resource reservation in the image forming system shown in FIG. 1.

FIG. 9 shows a sequence diagram that explains an auction process for a resource reservation in the image forming system shown in FIG. 1.

A user operates his/her client terminal apparatus 3-*i* and thereby sets a type and a reserved usage amount of a consumable good that the user wants to sell in an auction, and causes the client terminal apparatus 3-*i* to transmit an auction order based on the type and the reserved usage amount of the consumable good. The client terminal apparatus 3-*i* transmits the auction order to the management server 4 (in Step S41).

In the management server 4, the resource reservation management unit 42 receives the auction order using the communication device 21; and upon receiving the auction order, determines the seller user who transmitted the auction order, and registers in an auction object list an auction object (the consumable good type and the reserved usage amount), an auction period and a price setting such as minimum buyout price specified by the auction order so as to associate the specified auction object, the specified auction period, and the price setting with the determined seller user (in Step S42). The auction object list is stored in the storage device 22.

On the other hand, if another user wants to bid a price for a resource reservation in an auction, this user operates his/her client terminal apparatus 3-*j*, and thereby causes the client terminal apparatus 3-*j* to transmit an auction object list request. The client terminal apparatus 3-*j* transmits the auction object list request to the management server 4 (in Step S43). The resource reservation management unit 42 in the management server 4 receives the auction object list request using the communication device 21, and upon receiving the auction object list request, transmits the auction object list to the client terminal apparatus 3-*j* (in Step S44).

Upon receiving the auction object list, the client terminal apparatus 3-*j* displays the auction object list to the purchaser user. The bidder user performs to the client terminal apparatus 3-*j* an operation to specify an auction object that the bidder user wants to bid a price for in the auction object list. Upon receiving this operation, the client terminal apparatus 3-*j* transmits to the management server 4 a bidding order to bid a price for the specified auction object (in Step S45).

In this manner, from one or plural users, one or plural bidding orders are received.

In the management server 4, if an auction termination condition such as the end of the auction period is satisfied, then the resource reservation management unit 42 determines a successful bidder (i.e. a bidder user who transmitted the bidding order of the highest bidding price) (in Step S46).

Subsequently, the resource reservation management unit 42 performs a charging process for charging from the seller user to the successful bidder (purchaser) user, (b) renews the resource reservation data 31 of the seller user and the purchaser user, and (c) deletes the auction object in the auction object list (in Step S47).

Specifically, in the resource reservation data 31, the reserved usage amount of the specified consumable good type specified by the auction order in regard to the seller user is decreased by the reserved usage amount specified by the auction order, and the reserved usage amount of the specified consumable good type specified by the auction order in regard to the purchaser user is increased by the reserved usage amount specified by the auction order.

Upon the renewal of the resource reservation data 31, the resource reservation management unit 42 transmits a selling completion notification to the client terminal apparatus 3-*i* and transmits a purchase completion notification to the client terminal apparatus 3-*j*, using the communication device 21 (in Steps S48 and S49).

As mentioned, in the aforementioned embodiment, the management server 4 receives a print order from a user, and upon receiving the print order, performs a print job using the print system 1 under a print condition specified by the print order. In this process, the management server 4 generates a suggestion of a print condition in consideration of operation status of the print system 1, an amount of a consumable good required for the print job and the like, differently from the print condition specified by the print order; and notifies the user of the suggestion.

Consequently, the print order is fixed after the orderer side considers the suggestion from the recipient side, and therefore, a print order tends to be processed under an efficient condition for both of an orderer side and an order recipient side.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, if the orderer user sets a high priority on the delivery date and there is a resource reservation that can be purchased, the management server 4 may indicate in the order suggestion (a) the resource reservation that can be purchased and (b) a delivery date in a case that the user purchases this resource reservation (i.e. a reserved usage amount of a consumable good).

Further, in the aforementioned embodiment, if the delivery data desired in the print order (i.e. the base order) does not agree with the reservation period of the resource reservation, then such resource reservation is excluded when the order suggestion is generated.

What is claimed is:

1. An image forming system, comprising:
   a print system that comprises one or plural image forming apparatuses; and
   a management server configured to receive a print order from a user, and upon receiving the print order, perform a print job using the print system under a print condition specified by the print order;
   wherein the management server generates a suggestion of a print condition in consideration of operation status of the print system and an amount of a consumable good required for the print job, differently from the print condition specified by the print order; notifies the user of the suggestion;
   wherein the management server (a) receives from a user a resource reservation order to reserve a usage amount of the consumable good, and (b) generates the suggestion in further consideration of the reserved usage amount of the consumable good.

2. The image forming system according to claim 1, wherein the management server receives priority information from the user and the priority information indicates a priority level of each of one or plural specific items in the print condition; and the management server generates the suggestion in consideration of the priority information together with the operation status of the print system and the amount of the consumable good.

3. The image forming system according to claim 2, wherein the specific items include quality, cost, and delivery date.

4. The image forming system according to claim 1, wherein in accordance with a request from the user, the management server transfers or sells the reserved usage amount of the consumable good to another user.

5. The image forming system according to claim 4, wherein in accordance with a request from the user, the management server sells the reserved usage amount of the consumable good to another user in an auction manner.

6. An image forming system, comprising:

a print system that comprises one or plural image forming apparatuses; and a management server configured to receive a print order from a user, and upon receiving the print order, perform a print job using the print system under a print condition specified by the print order;

wherein the management server (a) receives from a user a resource reservation order to reserve a usage amount of the consumable good, (b) performs the print job using the reserved usage amount of the consumable good, and (c) in accordance with a request from the user, transfers or sells the reserved usage amount of the consumable good to another user.

\* \* \* \* \*